(12) United States Patent
Fujihara et al.

(10) Patent No.: US 7,544,443 B2
(45) Date of Patent: Jun. 9, 2009

(54) NONAQUEOUS ELECTROLYTE SECONDARY BATTERY

(75) Inventors: Toyoki Fujihara, Naruto (JP); Atsushi Yanai, Itano-gun (JP); Naoya Nakanishi, Tokushima (JP); Toshiyuki Nohma, Kobe (JP); Keisuke Minami, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/714,132

(22) Filed: Mar. 6, 2007

(65) Prior Publication Data

US 2007/0212607 A1    Sep. 13, 2007

(30) Foreign Application Priority Data

Mar. 9, 2006 (JP) ............................. 2006-064235
Dec. 26, 2006 (JP) ............................. 2006-349680

(51) Int. Cl.
*H01M 4/58* (2006.01)
(52) U.S. Cl. ................ 429/231.95; 429/231.1
(58) Field of Classification Search ............ None
See application file for complete search history.

(56) References Cited

U.S. PATENT DOCUMENTS

2004/0076887 A1* 4/2004 Panitz et al. ............. 429/330
2005/0106465 A1* 5/2005 Minami et al. .......... 429/231.95
2005/0112054 A1* 5/2005 Eberman et al. .......... 423/594.4
2005/0221185 A1* 10/2005 Sakata et al. ............. 429/231.8
2007/0218370 A1* 9/2007 Deguchi et al. ............. 429/306

FOREIGN PATENT DOCUMENTS

JP          5-242891 A      9/1993
JP       2004-161526 A      6/2004
WO    WO/2005/099023    * 10/2005

* cited by examiner

*Primary Examiner*—Dah-Wei D Yuan
*Assistant Examiner*—Maria J Laios
(74) *Attorney, Agent, or Firm*—Westerman, Hattori, Daniels & Adrian, LLP.

(57) ABSTRACT

A nonaqueous electrolyte secondary battery 10 according to an embodiment of the present invention includes a positive electrode 11 having a positive electrode active material that can intercalate and deintercalate lithium, a negative electrode 12 having a negative electrode active material that can intercalate and deintercalate lithium, and a nonaqueous electrolyte having lithium ion conductivity. The positive electrode active material is a layered lithium transition metal composite oxide (for example, one represented by $Li_{1+x}(Ni_yCo_zMn_{1-y-z})_{1-x}O_2$ (where $0 \leq x \leq 0.15$, $0.1 \leq y \leq 0.6$, and $0 \leq z \leq 0.5$)) to which an IVa group element (Zr) and a Va group element (Nb) are added. According to these features, it is possible to provide a nonaqueous electrolyte secondary battery with a selected element to be added to the lithium transition metal composite oxide to reduce the I-V resistance (improve the I-V characteristic), and thereby improving the output/input characteristics.

5 Claims, 1 Drawing Sheet

NONAQUEOUS ELECTROLYTE SECONDARY BATTERY

BACKGROUND

1. Technical Field

The present invention relates to a nonaqueous electrolyte secondary battery including a positive electrode having a layered lithium transition metal composite oxide as a positive electrode active material, a negative electrode having a negative electrode active material that can intercalate and deintercalate lithium, and a nonaqueous electrolyte having lithium ion conductivity.

2. Related Art

In recent years, as a battery for use in potable video cameras, cellular phones, portable electronic/communications devices, such as notebook personal computers, and the like, there has been commercialized a nonaqueous electrolyte secondary battery that includes a negative electrode active material made of a carbon material, alloy, or the like, that can intercalate and deintercalate lithium ions and a positive electrode active material made of a lithium-containing transition metal oxide, such as lithium cobalt oxide ($LiCoO_2$), lithium manganese oxide ($LiMn_2O_4$), or lithium nickel oxide ($LiNiO_2$), and features its small size, light weight, and high voltage, as well as high capacity and rechargeability.

Of lithium-containing transition metal oxides used as a positive electrode active material for the nonaqueous electrolyte secondary battery described above, lithium nickel oxide ($LiNiO_2$) features its high capacity, but has the drawbacks of poor safety and large overvoltage. Thus, it is inferior to lithium cobalt oxide. Lithium manganese oxide ($LiMn_2O_4$) is advantageously abundant in resources and low-cost, but has the shortcomings of low energy density and dissolution of manganese itself at high temperatures. Therefore, it is inferior to lithium cobalt oxide. For these reasons, lithium cobalt oxide ($LiCoO_2$) is currently used as a lithium transition metal oxide in most cases.

In the meantime, lithium cobalt oxide ($LiCoO_2$) is exposed to a potential of 4 V or more with respect to lithium. Therefore, when lithium cobalt oxide is used as a positive electrode active material for a nonaqueous electrolyte secondary battery, cobalt is eluted from the positive electrode each time the charge/discharge cycle is repeated. This undesirably deteriorates the positive electrode, reducing the capacity characteristics and load characteristics after each cycle is ended. Thus, there has been proposed a battery that uses $LiNi_xCo_{1-x}O_2$ obtained by improving lithium cobalt oxide ($LiCoO_2$) and lithium nickel oxide ($LiNiO_2$), as a positive electrode active material.

However, even if $LiNi_xCo_{1-x}O_2$ is used as a positive electrode active material, there remains a problem that the discharge capacity becomes smaller due to changes in crystal structure at the time of charge/discharge. Thus, a nonaqueous electrolyte secondary battery that can reduce changes in crystal structure to increase the discharge capacity as well as can improve thermal stability is proposed in Japanese Patent No. 3,244,314.

In the nonaqueous electrolyte secondary battery proposed in Japanese Patent No. 3,244,314, a lithium transition metal composite oxide (for example, $Li_{1.0}Mn_{0.1}Ni_{0.45}Co_{0.45}O_{2.0}$) represented by $Li_aM_bNi_cCo_dO_e$ (where M is at least one type of metal selected from the group consisting of Al, Mn, Sn, In, Fe, Cu, Mg, Ti, Zn, and Mo, $0<a<1.3$, $0.02 \leq b \leq 0.5$, $0.02 \leq d/c+d \leq 0.9$, and $1.8<e<2.2$, and $b+c+d=1$, $0.34<c$) is used as a positive electrode active material.

Consequently, even if Li is extracted at the time of charge, the crystal structure is relatively stable. This prevents the crystal structure from collapsing even if charge/discharge is repeated, allowing reversible charge/discharge. Moreover, when M included in a positive electrode active material represented by $Li_aM_bNi_cCo_dO_e$ includes at least one type of metal selected from the group consisting of Cu and Fe, thermal stability of the battery in the presence of the electrolyte after charge can drastically be improved.

In addition, it is proposed in JP-A-2004-161526 to use a lithium transition metal composite oxide represented by $Li_c(Ni_dMn_eCo_fM_g)O_2$ (where M is at least one type of element selected from the group consisting of Fe, Cr, V, Ti, Cu, Al, Ga, Bi, Sn, Zn, Mg, Ge, Nb, Ta, Be, B, Ca, Sc, and Zr), $0.8 \leq c \leq 1.2$, $0 \leq d \leq 1$, $0 \leq e \leq 1$, $0 \leq f \leq 1$, $0 \leq g \leq 1$, and $d+e+f+g=1$) as a positive electrode active material.

However, even if the positive electrode active material represented by $Li_aM_bNi_cCo_dO_e$ proposed in Japanese Patent No. 3,244,314 or the positive electrode active material represented by $Li_c(Ni_dMn_eCo_fM_g)O_2$ proposed in JP-A-2004-161526 described above is used, there occurs a problem that the I-V characteristic (I-V resistance: I-V resistance is obtained by measuring the voltage when a battery is charged or discharged for a given period at some currents, and then calculating the slope of the voltage to each current; the resistance serves as an index to see how many amperes of current can be passed through the battery,) is not improved. If the I-V characteristic (I-V resistance) is not improved, there is a problem that when such a battery is used as the power supply for an electric car, or the like, adequate output/input characteristics cannot be obtained.

SUMMARY

An advantage of an aspect of the invention is to provide a nonaqueous electrolyte secondary battery with a selected element to be added to a lithium transition metal composite oxide to reduce the I-V resistance (improve the I-V characteristic), and thereby improving the output/input characteristics.

According to an aspect of the invention, a nonaqueous electrolyte secondary battery includes a positive electrode having a positive electrode active material capable of intercalating and deintercalating lithium, a negative electrode having a negative electrode active material capable of intercalating and deintercalating lithium, and a nonaqueous electrolyte having lithium ion conductivity. The positive electrode active material is a layered lithium transition metal composite oxide to which an IVa group element and a Va group element are added. In this case, the positive electrode active material is preferably a layered lithium transition metal composite oxide represented by $Li_{1+x}(Ni_yCo_zMn_{1-y-z})_{1-x}O_2$ (where $0 \leq x \leq 0.15$, $0.1 \leq y \leq 0.6$, and $0 \leq z \leq 0.5$).

Here, it is apparent that if a lithium transition metal composite oxide represented by $Li_{1+x}(Ni_yCo_zMn_{1-y-z})_{1-x}O_2$ (where $0 \leq x \leq 0.15$, $0.1 \leq y \leq 0.6$, and $0 \leq z \leq 0.5$) and to which no IVa and Va group elements are added is used as a positive electrode active material, the I-V characteristic (I-V resistance) is not sufficiently improved. It is also apparent that even if an IVa group element consisting of Zr or a Va group element consisting of Nb is solely added to a lithium transition metal composite oxide represented by $Li_{1+x}(Ni_yCo_zMn_{1-y-z})_{1-x}O_2$, the I-V characteristic (I-V resistance) is not sufficiently improved.

On the other hand, it is apparent that when both an IVa group element consisting of Zr and a Va group element consisting of Nb are added and mixed to a lithium transition metal composite oxide represented by $Li_{1+x}(Ni_yCo_zMn_{1-y-z})_{1-x}O_2$, the I-V characteristic is improved (I-V resistance is reduced). Currently the reason for such an improvement is not clear. This is presumably because the IVa group element consisting of Zr and the Va group element consisting of Nb help each other be solid-solved into the lithium transition metal composite oxide, reforming the surface of the positive electrode active material and thereby reducing interface resistance with the electrolyte.

Addition in this invention brings about the coexistence of a state in which an IVa group element and a Va group element are solid-solved in a lithium transition metal composite oxide represented by $Li_{1+x}(Ni_yCo_zMn_{1-y-z})_{1-x}O_2$ and another state in which portions of these substances that cannot be solid-solved appear on the surface of the lithium transition metal composite oxide in the form of additives or in the form of solid solutions of additives and Li, or the like.

In this case, it is preferable that the IVa group element be Zr and the Va group element be Nb. As for the added amount, it is preferable that Zr of 0.05 to 3 mole % and Nb of 0.05 to 3 mole % be added to the lithium transition metal composite oxide represented by $Li_{1+x}(Ni_yCo_zMn_{1-y-z})_{1-x}O_2$. This is because if the added amount of each of Zr and Nb is less than 0.05 mole %, the output/input characteristics cannot sufficiently be obtained, and if each added amount exceeds 3 mole %, the capacity per mass of the positive electrode active material is reduced, which increases the thickness of the positive electrode and thereby reduces the output characteristic.

According to the invention, an IVa group element consisting of Zr and a Va group element consisting of Nb are added and mixed to a lithium transition metal composite oxide. This makes it possible to achieve a nonaqueous electrolyte secondary battery that has sufficient output/input characteristics.

BRIEF DESCRIPTION OF THE DRAWINGS

The invention will be described with reference to the accompanying drawing.

DESCRIPTION OF EXEMPLARY EMBODIMENTS

Figure 1:
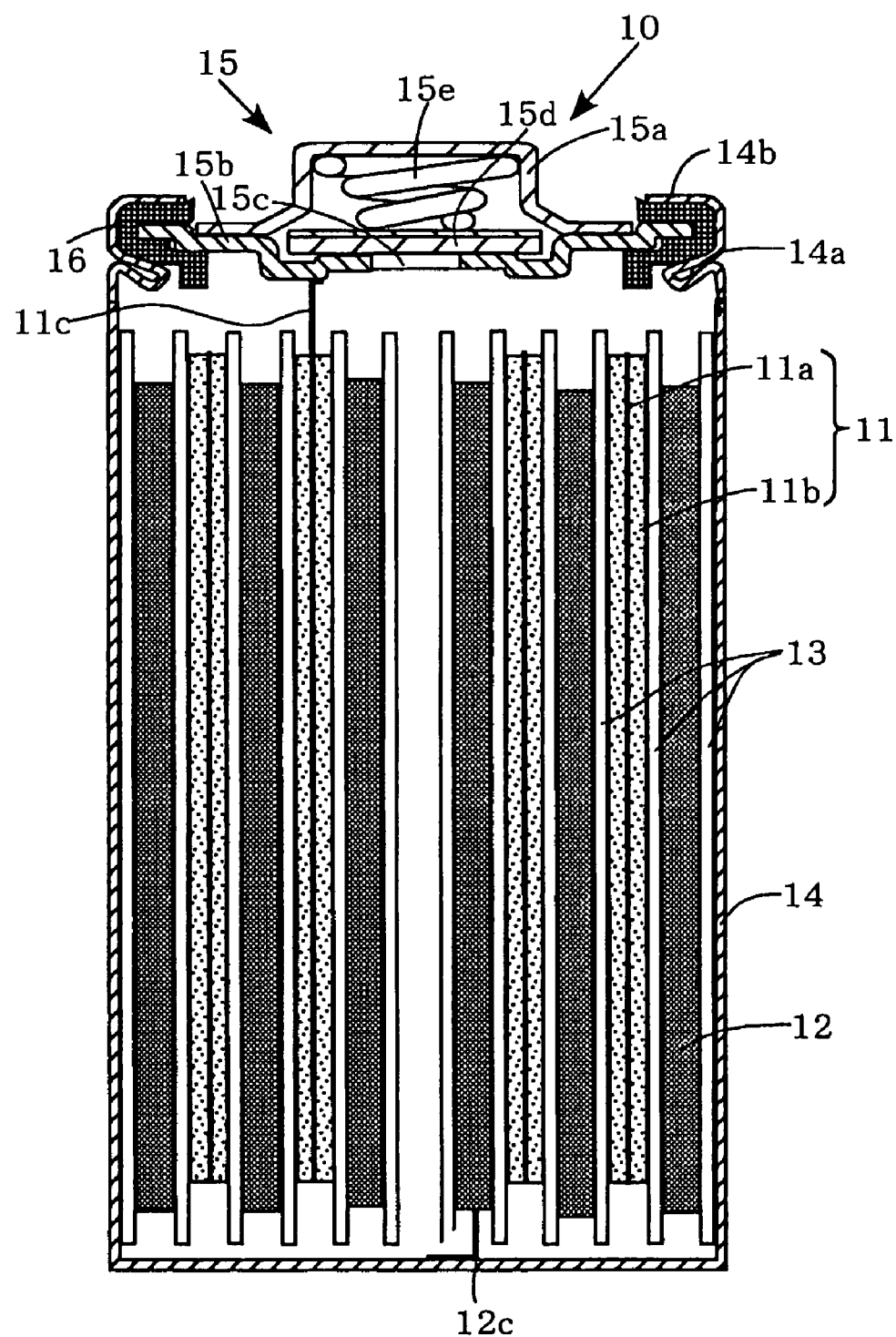
FIG. 1 is a sectional view schematically showing a nonaqueous electrolyte secondary battery according to an embodiment of the invention.

An embodiment of the invention will now be described below. However, the invention is not limited to this embodiment, and modifications can be made to this embodiment as necessary without departing from the scope and spirit of the invention. FIG. 1 is a sectional view schematically showing a nonaqueous electrolyte secondary battery according to this embodiment.

1. Positive Electrode Active Material (1) Positive Electrode Active Material Represented by $Li_{1.02}(Ni_{0.4}Co_{0.3}Mn_{0.3})_{0.98}O_2$ $Li_2CO_3$ and $(Ni_{0.4}Co_{0.3}Mn_{0.3})_3O_4$ are mixed so that the mole ratio of Li and $(Ni_{0.4}Co_{0.3}Mn_{0.3})$ is 1.02:0.98 (Li:$(Ni_{0.4}Co_{0.3}Mn_{0.3})$=1.02:0.98). Then, this resultant compound is heated at 900° C. in an air atmosphere for 20 hours, and whereby a lithium transition metal oxide having an average particle diameter of 12.1 μm and represented by $Li_{1.02}(Ni_{0.4}Co_{0.3}Mn_{0.3})_{0.98}O_2$ is obtained. This is defined as a positive electrode active material α.

(2) Positive Electrode Active Material Obtained by Adding Zr to $Li_{1.02}(Ni_{0.4}Co_{0.3}Mn_{0.3})_{0.98}O_2$ $Li_2CO_3$, $(Ni_{0.4}Co_{0.3}Mn_{0.3})_3O_4$, and $ZrO_2$ are mixed so that the mole ratio of Li, $(Ni_{0.4}Co_{0.3}Mn_{0.3})$, and Zr is 1.02:0.98:0.02 (Li:$(Ni_{0.4}Co_{0.3}Mn_{0.3})$:Zr=1.02:0.98:0.02). Then, this resultant compound is heated at 900° C. in an air atmosphere for 20 hours, and whereby a compound in which Zr is added to a lithium transition metal oxide having an average particle diameter of 12.7 μm and represented by $Li_{1.02}(Ni_{0.4}Co_{0.3}Mn_{0.3})_{0.98}O_2$ is obtained. This is defined as a positive electrode active material β.

In this case, the addition of Zr brings about the coexistence of a state in which Zr is solid-solved in $Li_{1.02}(Ni_{0.4}Co_{0.3}Mn_{0.3})_{0.98}O_2$ and another state in which a portion of Zr that cannot be solid-solved appears on the surface of $Li_{1.02}(Ni_{0.4}Co_{0.3}Mn_{0.3})_{0.98}O_2$ in the form of $ZrO_2$ or in the form of a solid solution ($Li_2ZrO_3$) of $ZrO_2$ and Li or the like.

(3) Positive Electrode Active Material Obtained by Adding Nb to $Li_{1.02}(Ni_{0.4}Co_{0.3}Mn_{0.3})_{0.98}O_2$ $Li_2CO_3$, $(Ni_{0.4}Co_{0.3}Mn_{0.3})_3O_4$, and $Nb_2O_3$ are mixed so that the mole ratio of Li, $(Ni_{0.4}Co_{0.3}Mn_{0.3})$, and Nb is 1.02:0.98:0.02 (Li:$(Ni_{0.4}Co_{0.3}Mn_{0.3})$:Nb=1.02:0.98:0.02). Then, this resultant compound is heated at 900° C. in an air atmosphere for 20 hours, and whereby a compound in which Nb is added to a lithium transition metal oxide having an average particle diameter of 12.7 μm and represented by $Li_{1.02}(Ni_{0.4}Co_{0.3}Mn_{0.3})_{0.98}O_2$ is obtained. This is defined as a positive electrode active material γ.

In this case, the addition of Nb brings about the coexistence of a state in which Nb is solid-solved in $Li_{1.02}(Ni_{0.4}Co_{0.3}Mn_{0.3})_{0.98}O_2$ and another state in which a portion of Nb that cannot be solid-solved appears on the surface of $Li_{1.02}(Ni_{0.4}Co_{0.3}Mn_{0.3})_{0.98}O_2$ in the form of $Nb_2O_3$ or in the form of a solid solution ($LiNbO_3$) of $Nb_2O_3$ and Li or the like.

(4) Positive Electrode Active Material Obtained by Adding Zr and Nb to $Li_{1.02}(Ni_{0.4}Co_{0.3}Mn_{0.3})_{0.98}O_2$ $Li_2CO_3$, $(Ni_{0.4}Co_{0.3}Mn_{0.3})_3O_4$, $ZrO_2$, and $Nb_2O_3$ are mixed so that the mole ratio of Li, $(Ni_{0.4}Co_{0.3}Mn_{0.3})$, Zr, and Nb is 1.02:0.98:0.01:0.01 (Li:$(Ni_{0.4}Co_{0.3}Mn_{0.3})$:Zr:Nb=1.02:0.98:0.01:0.01. Then, this resultant compound is heated at 900° C. in an air atmosphere for 20 hours, and whereby a compound in which Zr and Nb are added to a lithium transition metal oxide having an average particle diameter of 12.2 μm and represented by $Li_{1.02}(Ni_{0.4}Co_{0.3}Mn_{0.3})_{0.98}O_2$ is obtained. This is defined as a positive electrode active material δ.

In this case, the addition of Zr and Nb brings about the coexistence of a state in which Zr and Nb are solid-solved in $Li_{1.02}(Ni_{0.4}Co_{0.3}Mn_{0.3})_{0.98}O_2$ and another state in which portions of Zr and Nb that cannot be solid-solved appear on the surface of $Li_{1.02}(Ni_{0.4}Co_{0.3}Mn_{0.3})_{0.98}O_2$ in the form of $ZrO_2$ and $Nb_2O_3$ or in the form of solid solutions ($Li_2ZrO_3$, $LiNbO_3$) of $ZrO_2$, $Nb_2O_3$, and Li, or the like.

(5) Positive Electrode Active Material Obtained by Adding Zr to $Li_{1.07}(Ni_{0.4}Co_{0.3}Mn_{0.3})_{0.93}O_2$ $Li_2CO_3$, $(Ni_{0.4}Co_{0.3}Mn_{0.3})_3O_4$, and $ZrO_2$ are mixed so that the mole ratio of Li, $(Ni_{0.4}Co_{0.3}Mn_{0.3})$, and Zr is 1.07:0.93:0.01 (Li:$(Ni_{0.4}Co_{0.3}Mn_{0.3})$:Zr=1.07:0.93:0.01). Then, this resultant compound is heated at 900° C. in an air atmosphere for 20 hours, and whereby a compound in which Zr is added to a lithium transition metal oxide having an average particle diameter of 12.1 μm and represented by $Li_{1.07}(Ni_{0.4}Co_{0.3}Mn_{0.3})_{0.93}O_2$ is obtained. This is defined as a positive electrode active material ε.

In this case, the addition of Zr brings about the coexistence of a state in which Zr is solid-solved in $Li_{1.07}(Ni_{0.4}Co_{0.3}Mn_{0.3})_{0.93}O_2$ and another state in which a portion of Zr that cannot be solid-solved appears on the surface of $Li_{1.07}(Ni_{0.4}Co_{0.3}Mn_{0.3})_{0.93}O_2$ in the form of $ZrO_2$ or in the form of a solid solution ($Li_2ZrO_3$) of $ZrO_2$ and Li, or the like.

(6) Positive Electrode Active Material Obtained by Adding Nb to $Li_{1.07}(Ni_{0.4}Co_{0.3}Mn_{0.3})_{0.93}O_2$ $Li_2CO_3$, $(Ni_{0.4}Co_{0.3}Mn_{0.3})_3O_4$, and $Nb_2O_3$ are mixed so that the mole ratio of Li, $(Ni_{0.4}Co_{0.3}Mn_{0.3})$, and Nb is 1.07:0.93:0.01 $Li:(Ni_{0.4}Co_{0.3}Mn_{0.3}):Nb=1.07:0.93:0.01$. Then, this resultant compound is heated at 900° C. in an air atmosphere for 20 hours, and whereby a compound in which Nb is added to a lithium transition metal oxide having an average particle diameter of 11.8 μm and represented by $Li_{1.07}(Ni_{0.4}Co_{0.3}Mn_{0.3})_{0.93}O_2$ is obtained. This is defined as a positive electrode active material ζ.

In this case, the addition of Nb brings about the coexistence of a state in which Nb is solid-solved in $Li_{1.07}(Ni_{0.4}Co_{0.3}Mn_{0.3})_{0.93}O_2$ and another state in which a portion of Nb that cannot be solid-solved appears on the surface of $Li_{1.07}(Ni_{0.4}Co_{0.3}Mn_{0.3})_{0.93}O_2$ in the form of $Nb_2O_3$ or in the form of a solid solution ($LiNbO_3$) of $Nb_2O_3$ and Li, or the like.

(7) Positive Electrode Active Material Obtained by Adding Zr and Nb to $Li_{1.07}(Ni_{0.4}Co_{0.3}Mn_{0.3})_{0.93}O_2$ $Li_2CO_3$, $(Ni_{0.4}Co_{0.3}Mn_{0.3})_3O_4$, $ZrO_2$, and $Nb_2O_3$ are mixed so that the mole ratio of Li, $(Ni_{0.4}Co_{0.3}Mn_{0.3})$, Zr, and Nb is 1.07:0.93:0.005:0.005 $(Li:(Ni_{0.4}Co_{0.3}Mn_{0.3}):Zr:Nb=1.07:0.93:0.005:0.005)$. Then, this resultant compound is heated at 900° C. in an air atmosphere for 20 hours, and whereby a compound in which Zr and Nb are added to a lithium transition metal oxide having an average particle diameter of 12.0 μm and represented by $Li_{1.07}(Ni_{0.4}Co_{0.3}Mn_{0.3})_{0.93}O_2$ is obtained. This is defined as a positive electrode active material η.

In this case, the addition of Zr and Nb brings about the coexistence of a state in which Zr and Nb are solid-solved in $Li_{1.07}(Ni_{0.4}Co_{0.3}Mn_{0.3})_{0.93}O_2$ and another state in which portions of Zr and Nb that cannot be solid-solved appear on the surface of $Li_{1.07}(Ni_{0.4}Co_{0.3}Mn_{0.3})_{0.93}O_2$ in the form of $ZrO_2$ and $Nb_2O_3$ or in the form of solid solutions ($Li_2ZrO_3$, $LiNbO_3$) of $ZrO_2$, $Nb_2O_3$, and Li, or the like.

2. Positive Electrode

The positive electrode active materials α to η thus obtained, carbon powder serving as a conductive agent, and polyvinylidene fluoride (PVDF) serving as a binder are added to N-methyl-2-pyrrolidone (NMP) so that the mass ratio is 90:5:5, and mixed to make positive electrode slurry. The positive electrode slurry thus made is applied to a piece of aluminum foil serving as a positive electrode substrate 11a, and then dried to form a positive electrode active material layer 11b. Then, the positive electrode active material layer 11b thus formed is rolled using a roller until a predetermined packing density is obtained, and cut into predetermined sizes. Then positive electrodes 11 (a, b, c, d, e, f, g) are made by mounting a positive electrode collector tab 11c on the positive electrode active material layer 11b thus cut. Here, a positive electrode 11 made using the positive electrode active material α is defined as a positive electrode a. Similarly, one made using the positive electrode active material β is defined as a positive electrode b, one made using the positive electrode active material γ as a positive electrode c, and one made using the positive electrode active material δ as a positive electrode d. Moreover, one made using the positive electrode active material ε is defined as a positive electrode e, one made using the positive electrode active material ζ is defined as a positive electrode f, and one made using the positive electrode active material η as a positive electrode g.

3. Negative Electrode

A negative electrode 12 is made by using a lithium (Li) metal as a negative electrode active material and mounting a negative electrode collector tab 12c on this Li metallic.

4. Nonaqueous Electrolyte Secondary Battery (1) EXAMPLE 1

Each of the positive electrodes 11 (a to g) and the negative electrode 12 are laminated with a separator 13, formed of a polypropylene microporous film, interposed therebetween, and wound spirally to form spiral electrode groups. Then these spiral electrode groups are inserted into a cylindrical metallic outer can 14 that has a swaged portion 14a formed by swaging around the perimeter of an upper portion thereof. Then, the negative electrode collector tab 12c extending from the negative electrode 12 is welded to the inner bottom of the metallic outer can 14. On the other hand, the positive electrode collector tab 11c extending from the positive electrode 11 is welded to the bottom of a positive electrode lid 15b of a sealing unit 15. Disposed around the perimeter of the sealing unit 15 is a ring-shaped insulation gasket 16. Disposed above the positive electrode lid 15b is a cap-shaped positive electrode terminal 15a. Disposed inside this cap-shaped positive electrode terminal 15a is a valve unit including a valve 15d for sealing an exhaust hole 15c formed in the center of the positive electrode lid 15b and a spring 15e for pressing the valve 15d.

Then, $LiPF_6$ of 1 mole/liter is dissolved into a mixed solvent of ethylene carbonate (EC) and diethyl carbonate (DEC) with a volume ratio of 3:7. Thus a nonaqueous electrolyte is prepared. Then, this nonaqueous electrolyte is injected into the metallic outer can 14. Then, the sealing unit 15 having the ring-shaped insulating gasket 16 around the perimeter thereof is disposed on the swaged portion 14a formed around the perimeter of the upper portion of the metallic outer can 14. Then, an upper edge 14b of the metallic outer can 14 is swaged toward the sealing unit 15 to seal the metallic outer can 14. Thus, cylindrical nonaqueous electrolyte secondary batteries 10 (A to G) having a height of 65 mm, a diameter of 18 mm, and a design capacity of 30 mAh are made. One made using the positive electrode a is defined as a battery A, one made using the positive electrode b as a battery B, one made using the positive electrode c as a battery C, and one made using the positive electrode d as a battery D. Moreover, one made using the positive electrode e is defined as a battery E, one made using the positive electrode f as a battery F, and one made using the positive electrode g as a battery G.

I-V Characteristic Test

The I-V resistance of each of the nonaqueous electrolyte secondary batteries (A to G) thus made was measured as follows. In this case, those batteries were charged up to 50% of SOC (state of charge: charge depth) at 1 It ("It" is a value represented by a rated capacity (mA)/1 h (time)), and then were charged for 10 sec. and discharged for 10 sec. at ⅓ It, 1 It, 3 It, and 5 It, centering on 50% of SOC. Then the battery voltage 10 sec. after each of such charges and discharges was plotted with respect to the current to obtain the slope as the I-V resistance (I-V resistance at the time of charge and I-V resistance at the time of discharge). Table 1 below shows the results thus obtained. Note that the rated capacity (mA) shows a capacity when the batteries were charged until the positive electrode reached 4.3 V at two currents of ⅓ It and ⅕ It, and then discharged at a current of ⅓ It until the positive electrode reached 2.5 V relative to lithium.

TABLE 1

| Battery type | Content of positive electrode Li transition metal oxide | Element added to Li transition metal oxide | Amount added to Li transition metal oxide | IV resistance At discharge ($\Omega$) | IV resistance At charge ($\Omega$) |
|---|---|---|---|---|---|
| A | $Li_{1.02}(Ni_{0.4}Co_{0.3}Mn_{0.3})_{0.98}O_2$ | No additive | 0 | 1.05 | 1.10 |
| B | $Li_{1.02}(Ni_{0.4}Co_{0.3}Mn_{0.3})_{0.98}O_2$ | Zr | 2.0 mole % | 1.16 | 1.39 |
| C | $Li_{1.02}(Ni_{0.4}Co_{0.3}Mn_{0.3})_{0.98}O_2$ | Nb | 2.0 mole % | 1.00 | 1.06 |
| D | $Li_{1.02}(Ni_{0.4}Co_{0.3}Mn_{0.3})_{0.98}O_2$ | Zr Nb | 1.0 mole % 1.0 mole % | 0.95 | 1.03 |
| E | $Li_{1.07}(Ni_{0.4}Co_{0.3}Mn_{0.3})_{0.93}O_2$ | Zr | 1.0 mole % | 0.79 | 0.76 |
| F | $Li_{1.07}(Ni_{0.4}Co_{0.3}Mn_{0.3})_{0.93}O_2$ | Nb | 1.0 mole % | 0.80 | 0.72 |
| G | $Li_{1.07}(Ni_{0.4}Co_{0.3}Mn_{0.3})_{0.93}O_2$ | Zr Nb | 0.5 mole % 0.5 mole % | 0.74 | 0.68 |

From the results shown in Table 1 above, it is obviously understood that the battery B that uses the positive electrode active material β in which Zr of 2.0 mole % is added to the lithium transition metal oxide ($Li_{1.02}(Ni_{0.4}Co_{0.3}Mn_{0.3})_{0.98}O_2$) demonstrates an I-V resistance higher than the battery A that uses the positive electrode active material α containing only a lithium transition metal oxide ($Li_{1.02}(Ni_{0.4}Co_{0.3}Mn_{0.3})_{0.98}O_2$). In other words, the battery B has reduced output/input characteristics.

For the battery C that uses the positive electrode active material γ in which Nb of 2.0 mole % is added to a lithium transition metal oxide ($Li_{1.02}(Ni_{0.4}Co_{0.3}Mn_{0.3})_{0.98}O_2$), it is understood that the battery C demonstrates an I-V resistance lower than the battery A that uses the positive electrode active material α containing only a lithium transition metal oxide ($Li_{1.02}(Ni_{0.4}Co_{0.3}Mn_{0.3})_{0.98}O_2$). In other words, the battery C has improved output/input characteristics compared to the battery A.

For the battery D that uses the positive electrode active material δ in which Zr of 1.0 mole % and Nb of 1.0 mole % are added to a lithium transition metal oxide ($Li_{1.02}(Ni_{0.4}Co_{0.3}Mn_{0.3})_{0.98}O_2$), it is understood that the battery D demonstrates an I-V resistance lower than the battery C that uses the positive electrode active material γ in which Nb of 2.0 mole % is added to a lithium transition metal oxide ($Li_{1.02}(Ni_{0.4}Co_{0.3}Mn_{0.3})_{0.98}O_2$). In other words, the battery D has improved output/input characteristics compared to when Zr or Nb is solely added.

Here, a comparison is made between the batteries B, C, and D that use the positive electrode active materials in which Zr, Nb, and both Zr and Nb, respectively, are added to a lithium transition metal oxide represented by $Li_{1.02}(Ni_{0.4}Co_{0.3}Mn_{0.3})_{0.98}O_2$, and the batteries E, F, and G that use the positive electrode active materials in which Zr, Nb, and both Zr and Nb, respectively, are added to a lithium transition metal oxide represented by $Li_{1.07}(Ni_{0.4}Co_{0.3}Mn_{0.3})_{0.93}O_2$. It is understood that the batteries E, F, and G have improved output/input characteristics. This is presumably because the output/input characteristics are improved because an increase in composition of Li has led to a reduction in the amount of mixture of Ni into the Li layer, thereby facilitating diffusion of Li and improving the output/input characteristics.

(2) EXAMPLE 2

The positive electrode active material θ in which Zr of 0.5 mole % is added to a lithium transition metal oxide represented by $Li_{1.07}(Ni_{0.4}Co_{0.3}Mn_{0.3})_{0.93}O_2$ having an average particle diameter of 12.4 μm is prepared. Moreover, the positive electrode active material ι in which Nb of 0.5 mole % is added to a lithium transition metal oxide represented by $Li_{1.07}(Ni_{0.4}Co_{0.3}Mn_{0.3})_{0.93}O_2$ and having an average particle diameter of 12.5 μm is prepared.

Then, the positive electrode active materials θ and ι thus prepared, carbon powder serving as a conductive agent, and polyvinylidene fluoride (PVDF) serving as a binder are added to N-methyl-2-pyrrolidone (NMP) so that their mass ratio is 92:5:3, and mixed to make positive electrode slurry. Using the positive electrode slurry thus made, the position electrode h (one using the positive electrode active material θ) and the positive electrode i (one using the positive electrode active material ι) and the positive electrode j (one using the positive electrode active material η) are made as described above.

On the other hand, graphite serving as a negative electrode active material, and a polyamic acid solution serving as a binder are mixed to make negative electrode slurry (with the mass ratio of the negative electrode active material and the solid content of the binder of 97:3). Then, this negative electrode slurry is applied to a piece of copper foil serving as a negative electrode substrate, and dried. Then the dried negative electrode slurry is rolled using a roller until a predetermined packing density is obtained, and then subjected to heat treatment at a temperature of 300 to 400° C. in an inert atmosphere for 10 minutes. This heat treatment transforms polyamic acid into polyimide. Then, the negative electrode 12 is made by cutting the dried negative electrode slurry into predetermined sizes and then mounting the negative electrode collector tab 12c.

Next, each of the positive electrodes (h, i, and j) and the negative electrode 12 thus made are laminated with a separator 13, formed of a polyethylene microporous film, interposed therebetween, and wound spirally to form spiral electrode groups. Then, using these spiral electrode groups, cylindrical nonaqueous electrolyte secondary batteries 10 (H to J) having a height of 65 mm, a diameter of 18 mm, and a design capacity of 800 mAh are made as described above.

As an electrolyte, one obtained by adding vinylene carbonate of 1 mass % and lithium bis(oxalato)borate ($Li(B(C_2O_4)_2)$) of 0.1 M to a nonaqueous electrolyte obtained by dissolving $LiPF_6$ of 1 mole/liter into a mixed solvent of ethylene carbonate (EC) and ethyl methyl carbonate (EMC) with a volume ratio of 3:7 is used. A battery made using the positive electrode h is defined as a battery H, one made using the positive electrode i as a battery I, and one made using the positive electrode j as a battery J.

In the same manner as described above, the I-V resistance (I-V resistance at the time of initial charge and I-V resistance at the time of initial discharge) was obtained. Table 2 below shows the obtained results. In this case, the batteries H, I, and J were charged until the battery voltage reached a voltage of 4.1 V at a constant current of 1000 mA, and then charged until the current value reached 50 mA at a constant voltage of 4.1 V. Then, the batteries were discharged until the battery voltage reached 3.0 V at a constant current of 333 mA. Moreover, the batteries H, I, J with a charge depth of 50% were stored in a constant temperature bath at a temperature of 70° C. for 42 days, and then charged until the battery voltage reached 4.1 V at a constant current of 1000 mA. Then the batteries were charged until the current value reached 50 mA at a constant voltage of 4.1 V. Then the batteries were discharged until the battery voltage reached 3.0 V at a constant current of 333 mA. Thus, the I-V resistance after storage (I-V resistance at the time of charge after storage and I-V resistance at the time of discharge after storage) was obtained. Table 2 below shows the results thus obtained.

TABLE 2

| Battery type | Content of positive electrode | | Initial IV resistance | | After-storage IV resistance | |
|---|---|---|---|---|---|---|
| | Element added to Li transition metal oxide | Amount added to Li transition metal oxide | At discharge (mΩ) | At charge (mΩ) | At discharge (mΩ) | At charge (mΩ) |
| H | Zr | 0.5 mole % | 37.5 | 36.1 | 40.4 | 38.5 |
| I | Nb | 0.5 mole % | 37.4 | 36.1 | 41.6 | 39.8 |
| J | Zr | 0.5 mole % | 37.1 | 35.8 | 38.2 | 36.6 |
| | Nb | 0.5 mole % | | | | |

From the results shown in Table 2, it is apparently understood that using a positive electrode active material in which Zr, Nb, or both Zr and Nb is added to a Li transition metal oxide ($Li_{1.07}(Ni_{0.4}Co_{0.3}Mn_{0.3})_{0.93}O_2$) and adding lithium bis(oxalato)borate ($Li(B(C_2O_4)_2)$) to a nonaqueous electrolyte allow the battery to reduce its I-V resistance in the initial stage and after high temperature storage. This is presumably because of a resistance reduction effect caused by the existence of Zr and Nb as well as a synergistic effect between the resistance reduction effect and a resistance restraint effect during high temperature storage caused by lithium bis(oxalato)borate. Although the reason is unknown precisely, it is conceivable that hydrofluoric acid generated by lithium bis(oxalato)borate at high temperatures restrains deterioration of the positive electrode, and the battery shows a higher tolerance to the deterioration of the surface of the positive electrode when Zr and Nb coexist than when either of those substances exists solely, whereby this synergistic effect reduces resistance at the initial stage and after high temperature storage.

In the embodiment above, the example in which Zr is used as an IVa group element to be added to a lithium transition metal oxide ($Li_{1.02}(Ni_{0.4}Co_{0.3}Mn_{0.3})_{0.98}O_2$ or $Li_{1.07}(Ni_{0.4}Co_{0.3}Mn_{0.3})_{0.93}O_2$) has been described. Instead of Zr, however, Ti, Hf, or the like may be added as an IVa group element. Moreover, in the embodiment above, the example in which Nb is used as a Va group element to be added to a lithium transition metal oxide ($Li_{1.02}(Ni_{0.4}Co_{0.3}Mn_{0.3})_{0.98}O_2$ or $Li_{1.07}(Ni_{0.4}Co_{0.3}Mn_{0.3})_{0.93}O_2$) has been described. Instead of Nb, however, V, Ta, or the like may be added as a Va group element.

Moreover, in the embodiment above, the example that $Li_{1.02}(Ni_{0.4}Co_{0.3}Mn_{0.3})_{0.98}O_2$ or $Li_{1.07}(Ni_{0.4}Co_{0.3}Mn_{0.3})_{0.93}O_2$ is used as a lithium transition metal oxide has been described. However, a lithium transition metal oxide other than $Li_{1.02}(Ni_{0.4}Co_{0.3}Mn_{0.3})_{0.98}O_2$ and $Li_{1.07}(Ni_{0.4}Co_{0.3}Mn_{0.3})_{0.93}O_2$ can be expected to bring approximately similar results to what has been described above if such a lithium transition metal oxide is one represented by $Li_{1+x}(Ni_yCo_zMn_{1-y-z})_{1-x}O_2$ (where $0 \leq x \leq 0.15$, $0.1 \leq y \leq 0.6$, and $0 \leq z \leq 0.5$).

Further, as initial substances for synthesizing $Li_{1.02}(Ni_{0.4}Co_{0.3}Mn_{0.3})_{0.98}O_2$ or $Li_{1.07}(Ni_{0.4}Co_{0.3}Mn_{0.3})_{0.93}O_2$ in the embodiment above, $Li_2CO_3$, $(Ni_{0.4}Co_{0.3}Mn_{0.3})_3O_4$, $ZrO_2$, and $Nb_2O_3$ are used. However, the invention is not limited to these substances. For example, LiOH, $Li_2CO_3$ or the like may be used as a material for Li; $Ni_{0.4}Co_{0.3}Mn_{0.3}(OH)_2$ or the like as a material for NiCoMn; $Zr(OH)_4$ or the like as a material for Zr; and $NbO_2$ or the like as a material for Nb.

Furthermore, a Li metal is used as a negative electrode active material that can intercalate and deintercalate lithium in the embodiment above. Instead of a Li metal, however, natural graphite, artificial graphite, coke, carbon materials such as carbon fibers, lithium aluminum alloys, lithium lead alloys, lithium tin alloys, and other lithium alloys, metallic oxides such as tin oxide or titanium oxide may be used.

What is claimed is:

1. A nonaqueous electrolyte secondary battery comprising:
a positive electrode including a positive electrode active material capable of intercalating and deintercalating lithium;
a negative electrode including a negative electrode active material capable of intercalating and deintercalating lithium; and
a nonaqueous electrolyte having lithium ion conductivity,
the positive electrode active material being a layered lithium transition metal composite oxide represented by $Li_{1+x}(Ni_yCo_zMn_{1-y-z})_{1-x}O_2$, where $0 \leq x \leq 0.15$, $0.1 \leq y \leq 0.6$, and $0 \leq z \leq 0.5$ to which Zr and Nb are added, wherein the amount of Zr to the layered lithium transition metal composite oxide is 0.05~3 mole %, and that of said Nb is 0.05~3 mole %.

2. The nonaqueous electrolyte secondary battery according to claim 1, wherein the positive electrode active material contains Zr and Nb which are solid-solved into $Li_{1+x}(Ni_yCo_zMn_{1-y-z})_{1-x}O_2$, and Zr and Nb in at least one state selected from a state of oxide and a state of solid solution with lithium.

3. The nonaqueous electrolyte secondary battery according to claim 1, wherein the negative electrode active material capable of intercalating and deintercalating lithium is carbon material.

4. The nonaqueous electrolyte secondary battery according to claim 3, wherein the carbon material is graphite.

5. The nonaqueous electrolyte secondary battery according to claim 1, wherein the nonaqueous electrolyte contains lithium bis(oxalate)borate ($Li(B(C_2O_4)_2)$).

* * * * *